US009398497B2

(12) United States Patent
Jha

(10) Patent No.: US 9,398,497 B2
(45) Date of Patent: Jul. 19, 2016

(54) COMMUNICATIONS SYSTEM INCLUDING MAINTAINED CELL HISTORY DATA

(75) Inventor: Vivek Jha, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/390,489

(22) PCT Filed: Aug. 10, 2010

(86) PCT No.: PCT/JP2010/063791
§ 371 (c)(1),
(2), (4) Date: Feb. 14, 2012

(87) PCT Pub. No.: WO2011/021592
PCT Pub. Date: Feb. 24, 2011

(65) Prior Publication Data
US 2012/0142355 A1 Jun. 7, 2012

(30) Foreign Application Priority Data
Aug. 17, 2009 (GB) .................................. 0914379.3

(51) Int. Cl.
H04W 36/00 (2009.01)
H04W 36/24 (2009.01)
H04W 84/04 (2009.01)

(52) U.S. Cl.
CPC ........ H04W 36/0061 (2013.01); H04W 36/245 (2013.01); H04W 84/045 (2013.01)

(58) Field of Classification Search
CPC ............ H04W 36/0055; H04W 92/00; H04W 52/244; H04W 64/003; H04W 84/045; H04W 48/16; H04W 48/02; H04W 48/12
USPC .......... 455/436, 422.1, 432.1, 435.1; 370/331
See application file for complete search history.

(56) References Cited

U.S. PATENT DOCUMENTS

| 8,385,216 B1* | 2/2013 | Shetty et al. .................. 370/252 |
| 2004/0192313 A1 | 9/2004 | Otting |
| 2008/0043672 A1 | 2/2008 | Sebire et al. |
| 2008/0130578 A1 | 6/2008 | Wang et al. |

(Continued)

FOREIGN PATENT DOCUMENTS

| CN | 101507331 A | 8/2009 |
| EP | 2 028 907 A1 | 2/2009 |

(Continued)

OTHER PUBLICATIONS

R3-091022 3GPP TSG-RAN WG3 #62—May 4-8, 2009 San Francisco, USA Title: QoS principles for CSG member and non-members at Hybrid access mode HeNBs Source: Qualcomm Europe, T-Mobile, Telecom Italia.*

(Continued)

Primary Examiner — Nizar Sivji
(74) Attorney, Agent, or Firm — McGinn IP Law Group, PLLC

(57) ABSTRACT

A user communications device having active and idle states operates in a cellular communications network in which user communications devices communicate via network communications devices of cells of the network. History data identifying the cells in which the user communications device has camped whilst in the idle mode or identifying the cells in which the mobile device has been connected whilst in the connected mode is maintained. This history data can be used to identify a home base station.

17 Claims, 6 Drawing Sheets

(56) References Cited

U.S. PATENT DOCUMENTS

| | | | |
|---|---|---|---|
| 2009/0104905 A1* | 4/2009 | DiGirolamo et al. | ......... 455/434 |
| 2009/0132675 A1 | 5/2009 | Horn et al. | |
| 2009/0268689 A1 | 10/2009 | Fu et al. | |
| 2010/0210271 A1 | 8/2010 | Neubacher | |
| 2011/0130133 A1 | 6/2011 | Breuer et al. | |

FOREIGN PATENT DOCUMENTS

| | | |
|---|---|---|
| WO | WO 2008/020280 A1 | 2/2008 |
| WO | WO 2008/057359 A1 | 5/2008 |
| WO | WO 2008/086649 A1 | 7/2008 |
| WO | WO 2009/021711 A1 | 2/2009 |
| WO | WO 2009/043002 A2 | 4/2009 |
| WO | WO 2009/065053 A2 | 5/2009 |
| WO | WO 2009/068561 A2 | 6/2009 |

OTHER PUBLICATIONS

3GPP TS 25.413, $3^{rd}$ Generation Partnership Project; Technical Spseicfication Group Radio Access Network; UTRAN Iu interface, Radio Access Network Applaiction Part (RANAP) singalling (Release 8).

3GPP TS 25.401, V8.2.0 (Dec. 2008), 650, Route Des Lucioles Sophia-Antipolis Valbonne-France.

International Search Report in PCT/JP2010/063791 dated Nov. 18, 2010 (English Translation Thereof).

Alcatel-Lucent: "Support of Home NB and Home eNB enhancement RAN3 aspects" 3GPP Draft; RP-090349 $3^{rd}$ Generation Partnership Project (3GPP), Mobile Competence Centre; 650, Route des Lucioles; F-06921 Sophia-Antipolis Cedex; France; No. Biarritz, France Mar. 6, 2009 (Sep. 3, 2009) [retrieved on Sep. 3, 2009].

NEC "Enhancementof UE History Information for H(e)NB deployment scenarios" 3GPP Draft; R3-092018, $3^{rd}$ Generation Partnership Project (3GPP), Mobile Competence Centre; 650, Route des Lucioles; F-06921 Sophia-Antipolis Cedex; France; No. Shenzhen, China; 20090820, Aug. 28, 2009, [retrieved on Aug. 28, 2009].

3GPP TS 25.413, V8.3.0. (Jun. 2009),Technical Specification, $3^{rd}$ Generation Partnership Project; Techincal Specification Group Radio Access Network; UTRAN Iu interface Radio Access Network Application Part (RANAP) signalling (Release 8).

3GPP TS 25.401, V8.2.0. (Dec. 2008),Technical Specification, $3^{rd}$ Generation Partnership Project; Techincal Specification Group Radio Access Network; UTRAN overall description (Release 8).

3GPP TS 36.413, V8.6.1. (Jun. 2009),Technical Specification, $3^{rd}$ Generation Partnership Project; Techincal Specification Group Radio Access Network; Evolved Universal Terrestrial Radio Access Network (E-UTRAN) S1 Application Protocol (S1AP) (Release 8).

3GPP TS 36.300, V8.9.0. (Jun. 2009),Technical Specification, $3^{rd}$ Generation Partnership Project; Techincal Specification Group Radio Access Network; Evolved Universal Terrestrial Radio Access (E-UTRA) and Evolved Universal Terrestial Radio Access Network (E-UTRAN) Overall description Stage 2 (Release 8).

3GPP TS 36.423, V8.6.0. (Jun. 2009),Technical Specification, $3^{rd}$ Generation Partnership Project; Techincal Specification Group Radio Access Network; Evolved Universal Terrestrial Radio Access Network (E-URAN) X2 application protocol (X2AP) (Release 8).

3 GPP TSG SA WG2 Meeting # 71, Feb. 16-20, 2009, Budapest, Hungary, TD S2-091305, Architectural Requirements for HNB and HeNB.

"Qos principles for CSG members and non-members at Hybrid access mode HeNBs", 3GPP TSG-RAN WG3 #64 R3-091022, URL, http://ww.3gpp.org/ftp/tsg_ran/WG3_Iu/TSGR3_64/Docs/R3-091022.zip, May 4-8, 2009, San Francisco, USA.

Japanese Office Action dated Feb. 12, 2014 with an English translation.

Chinese Office Action (without English translation) and Search Report (with English Translation) dated Dec. 3, 2013.

"Support for Hybrid and Open access mode HeNBs", 3GPP TSG-RAN WG3 #64 R3-091020, May 4-8, 2009.

* cited by examiner

| Cell Global ID | | | ... | |
| --- | --- | --- | --- | --- |
| Cell Type | | | ... | |
| Time in Cell | | | ... | |
| Cell Access Mode | | | ... | |
| MT Access Mode | | | ... | | n cell entries

Figure 3b

COMMUNICATIONS SYSTEM INCLUDING MAINTAINED CELL HISTORY DATA

TECHNICAL FIELD

The present invention relates to mobile telecommunications networks, particularly but not exclusively networks operating according to the 3GPP standards or equivalents or derivatives thereof.

BACKGROUND ART

Mobile telecommunications networks enable users of User Equipment (UE) to communicate with other such users via one of a number of base stations and a core network. Each base station defines a number of cells of the network. In an active or connected state a UE is registered with the network and has an RRC (Radio Resource Control) connection with a base station so that the network knows to which cell the UE belongs and can transmit data to and receive data from the UE. In the Long Term Evolution (LTE) of UTRAN (UMTS Terrestrial Radio Access Net(work) referred to as E-UTRAN, in the connected state, the handover procedure allows UEs to have service continuity while moving between LTE cells and when moving to cells of other RATs (Radio Access Technologies), such as UTRAN cells and GERAN cells. Prior to handover, the serving cell requests the UE to make measurements on neighbouring cells identified on a cell list and to return the measurement results to the serving cell. The serving cell then uses these measurement results to select the target cell for the handover. This selection is usually based on the services that the candidate cells can provide and the signal quality measurements obtained from the UE.

A UE also has a power conservation or idle state in which, typically, the UE is not transmitting or receiving data and no context about the UE is stored by the base station. In the idle state the location of the UE is known only (to the MME (Mobility Management Entity) in 3GPP) at the granularity of a Tracking Area (TA) comprising a cluster or group of base station cells. When in the idle state, a UE reselects cells on which it will "camp" according to the parameters broadcasted in the BCH (Broadcast Channel) of the current cell on which it is camped, and the base stations are not aware of the cell reselections made by the UE as it moves within the network.

Release 8 of the LTE and UTRAN standards introduced the feature of the base station maintaining history information identifying where the UE has roamed during the connected mode and providing this history information to a target base station at the time of handover. This information is useful for making future handover decisions and for detecting unwanted "ping pong" situations where a UE is repeatedly transferred between two base stations. When in the idle mode, the UE may also maintain history information identifying the cells in which the UE has camped. When the UE enters its connected mode, the UE may then provide this history information to the serving cell. Again this UE generated history information may be useful for future handover decisions.

Under the 3GPP standards, a UTRAN base station is referred to as a NodeB and an E-UTRAN base station is referred to as an eNodeB or eNB. Recently the 3GPP standards body has adopted an official architecture and started work on a new standard for home base stations (NM). Where the home base station is operating in accordance with the LTE (Long Term Evolution) standards, the HNB is sometimes referred to as an HeNB. A similar architecture will also be applied in the WiMAX network. In this case, the home base station is commonly referred to as a femto cell. For simplicity, the present application will use the term HNB to refer to any such home base station. The HNB will provide radio coverage (for example, 3 G/4 G/WiMAX) within the home and will connect to the core network via a suitable public network (for example via an ADSL link to the Internet) and in the case of the 3GPP standards, via an optional HNB gateway (HNB-GW) which typically will aggregate traffic from several HNBs.

The HNB may be configured to operate using one of a plurality of access modes, namely: 'closed' in which the HNB operates as a closed subscriber group (CSG) cell; 'hybrid' in which the HNB operates as a CSG cell where at the same time, non-CSG members are allowed access (for example, to allow preferential treatment of CSG members); and 'open' in which the HNB operates as a normal (non-CSG) cell. It is understood that when the UE is close to its HNB it is preferable that it attempts to handover to its HNB. However, it is expected that more and more HNBs will be deployed and it will therefore be difficult for the base stations neighbouring the HNB to be able to identify the HNB of a specific UE.

SUMMARY OF THE INVENTION

The inventor has realised that with more detailed UE history information, and serving cell information, neighbouring cell information and/or SON information exchanged between the eNBs or eNB and RNC, where CSG mode and access control specific information is exchanged between the nodes, it may be easier to include the UE's HNB within the above described cell list that is sent to the UE just prior to handover. In this way, it is more likely that the UE's HNB will be the target cell that is elected for the handover.

Whereas, serving cell information, neighbouring cell information and/or SON information are exchanged in the cell specific messages and not related to UE specific procedures.

Cell information, Neighbouring cell information are exchanged in the X2AP X2 SETUP REQUEST and X2AP X2 SETUP RESPONSE, exchanged when X2 is setup between two eNBs. This information could also used to filter the neighbour cell list for the UE or some other purposes for example selectively X2 setup etc.

SON information is exchanged via the S1 interface (MME does the routing between the source eNB and target eNB) in the S1AP eNB CONFIGURATION TRANSFER (source eNB->MME) and S1AP MME CONFIGURATION TRANSFER (MME->target eNB) messages.

The present invention provides a base station operable to communicate with one or more mobile communications devices over a wireless communications link, wherein the base station is operable to maintain cell history data for a mobile communications device, the cell history data identifying the cells with which the mobile communications device has been connected and including, for one or more of the cells, data relating to an access mode of the cell.

The base station cell may use the stored history data for Radio Resource Management purposes. For example, the base station cell may use the information to identify cells to include in a cell list provided to the at least one mobile communications device. The base station cell may also provide the history information to a neighbouring cell via a base station interface or via a core network interface.

According to another aspect, the present invention provides a mobile communications device operable to store history data identifying the cells in which the mobile communications device has camped during an idle mode and including, for one or more of the cells, data relating to an access mode of the cell.

The mobile device may report the history data to a serving cell, for example, so that it can use the information for RRM purposes. The history data may be reported to the serving cell when the mobile device enters a connected mode to transfer user data with the serving cell.

The data relating to the access mode of the cell may define whether or not the cell has an Open, Closed or Hybrid access mode and in the case of a cell having a Hybrid access mode, the history data may further include data identifying whether or not the mobile device accessed the cell as a CSG member or a non-CSG member. The mobile device may simply store the history data or it may use the history data itself, for example to try to identify its own Home base station.

The present invention also provides a method performed by a mobile communications device having an idle mode and a connected mode and comprising, in the idle mode, storing history data identifying the cells in which the mobile communications device has camped and including, for one or more of the cells, data relating to an access mode of the cell.

The present invention also provides a method performed by a base station operable to communicate with one or more mobile communications devices over a wireless communications link defining a base station cell, the method comprising maintaining cell history data for a mobile communications device, the cell history data identifying the cells with which the mobile communications device has been registered and including, for one or more of the cells, data relating to an access mode of the cell.

The invention also provides, for all methods disclosed, corresponding computer programs or computer program products for execution on corresponding user communications devices or network communications devices. The invention also provides user communications devices and network communications devices configured or operable to implement the methods and components thereof) and methods of updating these.

BRIEF DESCRIPTION OF THE DRAWINGS

Embodiments of the invention will now be described, by way of example, with reference to the accompanying drawings, in which:

FIG. 3b illustrates the form of mobile telephone history data built up and maintained by the base station shown in FIG. 3a;

DETAILED DESCRIPTION OF EXEMPLARY EMBODIMENTS

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hardwired elements, software elements or firmware elements or any combination of these.

Overview

Figure 1:
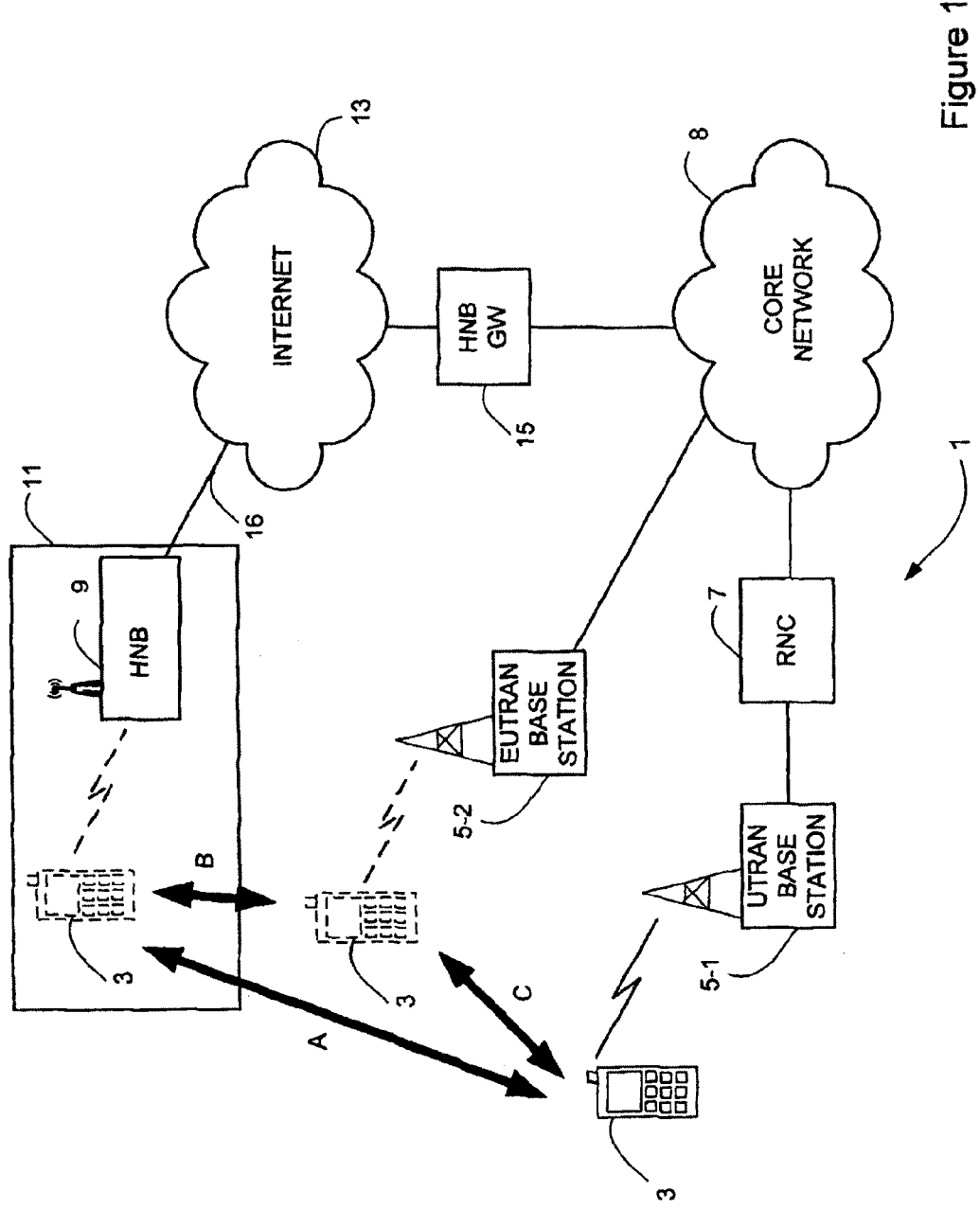
FIG. 1 illustrates schematically a cellular telecommunications system to which embodiments of the invention may be applied.

FIG. 1 schematically illustrates a mobile (cellular) telecommunication system 1 in which a user of a mobile telephone (MT) 3 can communicate with other users (not shown) via a macro cell of a 3 G Radio Access Network (RAN), such as via UTRAN base station 5-1 (and Radio Network Controller (RNC) 7) or E-UTRAN base station 5-2, and a core telephone network 8 when the user is away from a home base station (HNB) 9 located within a user's home 11. In the telecommunication system 1 the user may also communicate with the other users (not shown) the home base station 9, a public data network (in this case the Internet 13), a home base station gateway (HNB-GW) 15, and the core telephone network 8 when the user is within range of their home base station 9. The HNB 9 will typically connect to the HNB-GW 15 via a suitable Internet connection such as an ADSL or cable connection 16 and is programmed with the IP address of the HNB-GW 15 so that all uplink communications are transmitted via the HNB-GW 15. As those skilled in the art will appreciate, the HNB 11 can communicate with a number of different mobile telephones 3. It will be further appreciated that there is likely to be a large number of HNBs deployed within the network and there will be many more E-UTRAN and UTRAN base stations 5, although for simplicity of explanation, only one of each base station is illustrated.

As with most telecommunication systems, the system 1 is configured to support mobility between cells, including: relocation A of the mobile telephone 3 from the macro cell of the UTRAN base station 5-1 to the HNB 9 (and vice versa); relocation B of the mobile telephone 3 from the macro cell of the E-UTRAN base station 5-2 to the HNB 9 (and vice versa); and relocation C of the mobile telephone 3 from the macro cell of the UTRAN base station 5-1 to the macro cell of the E-UTRAN base station 5-2 (and vice versa). The mobile telephone 3 can also relocate from one UTRAN cell to another, from one E-UTRAN cell to another and from one HNB 9 to another, although these are not shown in FIG. 1 for simplicity.

As mentioned above, mobile telephones 3 designed for use in LTE and UTRAN communications networks have connected and idle modes or states. In the connected mode a mobile telephone 3 is registered with the network and has an RRC (Radio Resource Control) connection with a base station 5 so that the network knows to which cell the mobile telephone 3 belongs and can transmit data to and receive data from the mobile telephone 3. In LTE and UTRAN, a handover procedure allows mobile telephones 3 in the connected mode to have service continuity while moving from one LTE cell to another and whilst moving to cells of other RATs (Radio Access Technologies).

As discussed above, serving UTRAN and E-UTRAN base stations 5/9 collect and store history information for a connected mode mobile telephone 3 that it is serving for as long as the mobile telephone 3 stays in one of its cells. The resulting information is then used in subsequent handover preparations by means of the Handover Preparation procedures over the S1 and X2 interfaces, which provide the target base station 5/9 with a list of previously visited cells and associated (per-cell) information elements. The Handover Preparation procedures also trigger the target base station 5 to start collection and storage of history information for the mobile telephone 3 and thus to propagate the collected information.

In this embodiment, the cell information collected for a mobile telephone 3 includes, among other things, data identifying the access mode of the cell to which the mobile telephone 3 is connected (eg Open, Closed or Hybrid) and, for cells having a Hybrid access mode, data identifying if the mobile telephone 3 accessed as a CSG member or non-CSG member. The serving base station 5 is able to use this access mode information to select better candidate target cells for handover. At present, it is just the HNBs 9 that have Open, Closed or Hybrid access modes. However, it is envisaged that in the future other cells, such as the macro cells will also have such access modes.

Figure 2:
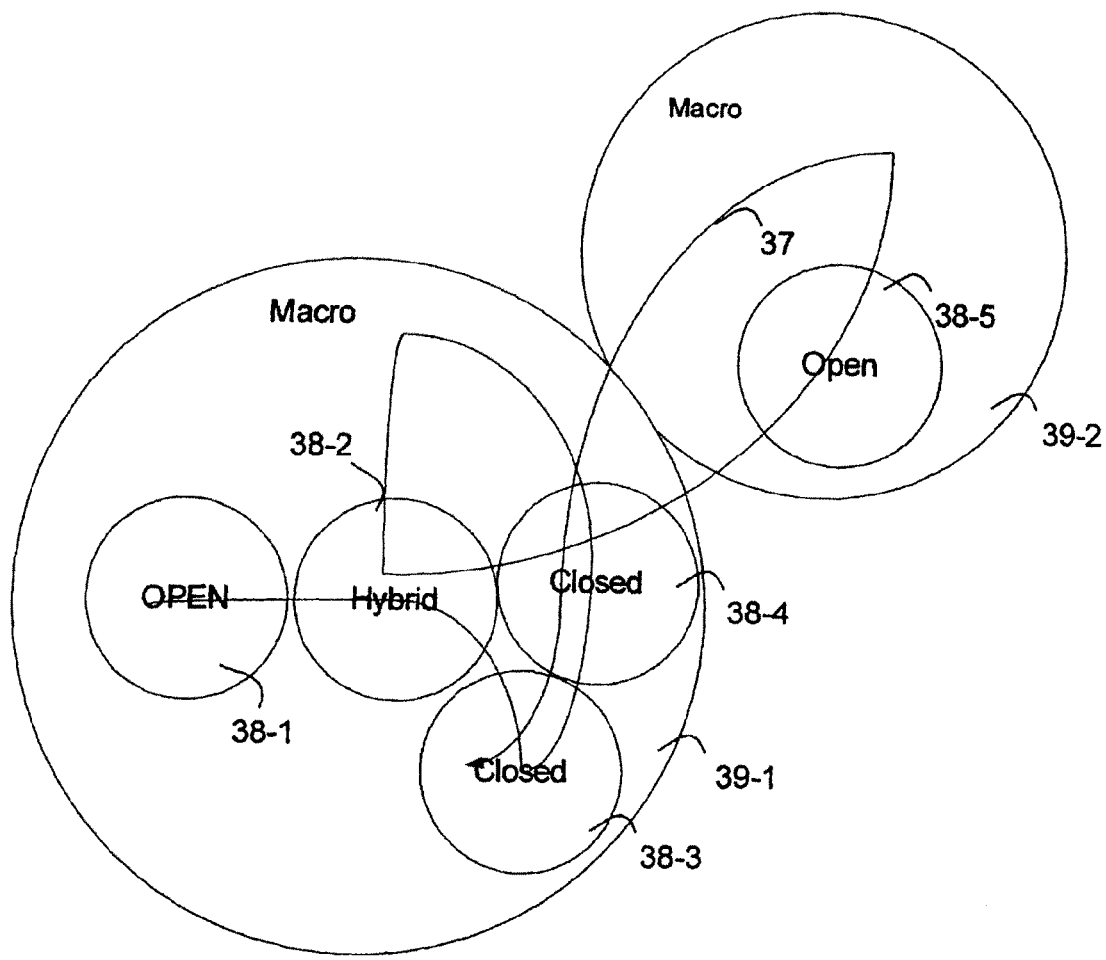
FIG. 2 illustrates a path taken by a mobile telephone as it roams from cell to cell.

A typical path 37 travelled by a mobile telephone 3 is illustrated in FIG. 2. The path 37 shows that the mobile telephone 3 will typically move between a number of smaller cells 38 (probably HNBs or some other small cells) and between a number of macro cells 39 defined by the E-UTRAN and UTRAN base stations 5. When the mobile telephone 3 is close to its own HNB 9, it is likely to appear one or more times in the cell history data for the mobile telephone 3. Therefore, by providing additional information about the cell's access mode etc, the base station 5/9 can process the history data and identify cells that are likely to be the mobile telephone's HNB 9. This is beneficial for the user as the user may have special rates when served by the HNB 9 rather than when it is being served by a macro cell.

Optionally, the mobile telephone 3 is configured, when in its idle mode, to maintain similar history data relating to the cells of the cellular communications network in which it has camped and to provide such history data to the serving base station 5 when the mobile telephone 3 first enters its RRC connected mode. If this information is available, the serving base station 5 can also use this idle state history information to predict target cells for future handover and to detect ping pang of the mobile telephone 3 between two cells. The serving base station 5/9 may also use this information to populate the cell history information that the base station builds and maintains whilst the mobile telephone 3 is in its connected mode.

Base Station

Figure 3A:
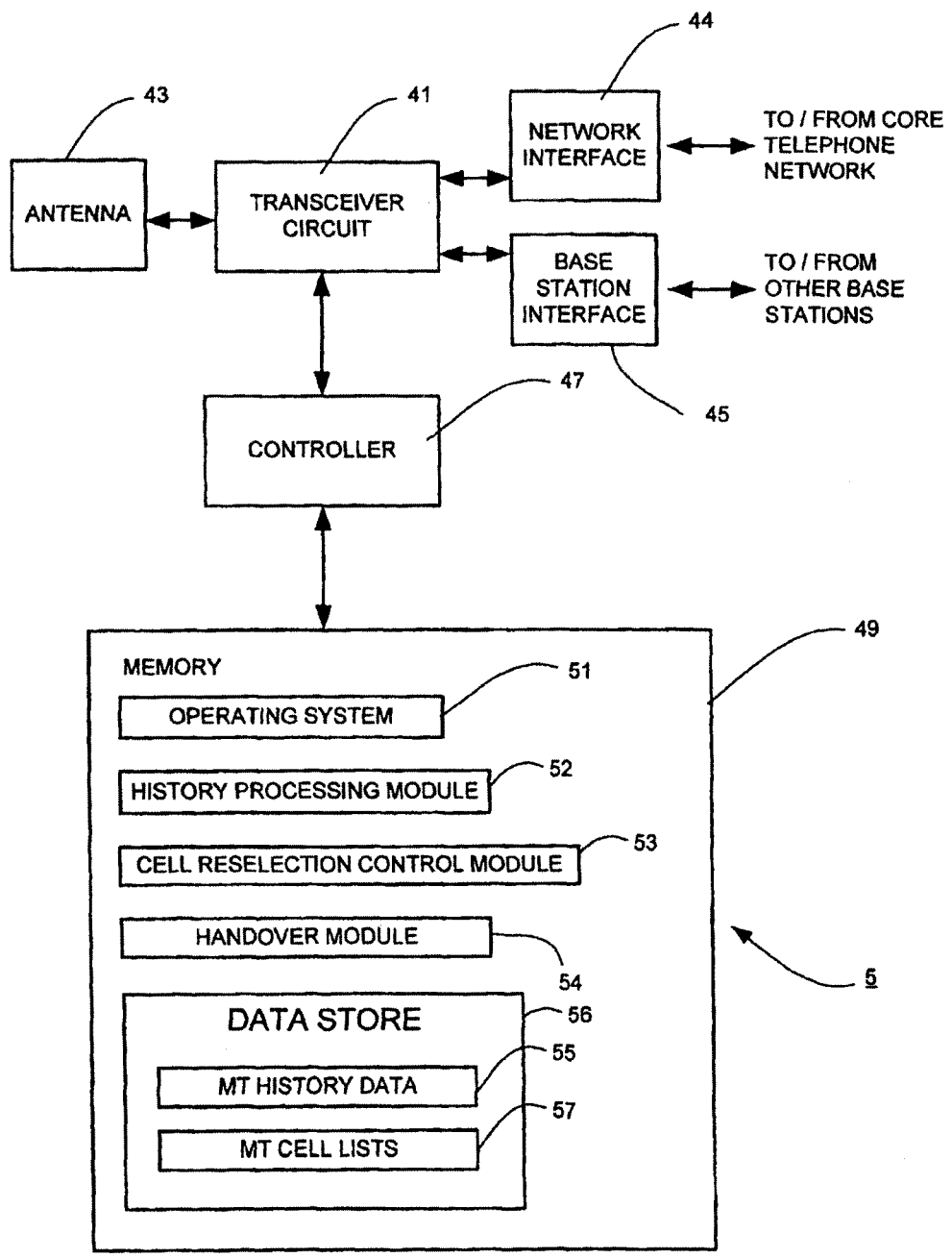
FIG. 3a is a functional block diagram to show some of the functionality of a base station forming part of the system shown in FIG. 1.

FIG. 3a shows a functional block diagram of the E-UTRAN base station 5-2 shown in FIG. 1. The HNB 9 and the UTRAN base station 5-1 will have a similar structure. As shown, the base station 5-2 has a transceiver circuit 41 for transmitting signals to and for receiving signals from mobile telephones 3 via one or more antenna 43, a network interface 44 (S1) for transmitting signals to and for receiving signals from the core network 7 and a base station interface 45 (X2) for transmitting signals to and for receiving signals from other E-UTRAN base stations 5. The E-UTRAN base station 5-2 has a controller 47 to control the operation of the base station 5-2. The controller 47 is associated with a memory 49. Although not necessarily shown in FIG. 3a, the base station 5-2 will of course have all the usual functionality of a cellular telephone network base station and this may be provided by any one or any combination of hardware, software and firmware, as appropriate. Software may be pre-installed in the memory 49 and/or may be downloaded via the telecommunications network 8 or from a removable data storage device (RMD), for example. The controller 47 is configured to control overall operation of the base station 5-2 by, in this example, program instructions or software instructions stored within memory 49. As shown, these software instructions include, among other things, an operating system 51, a history processing module 52, a cell reselection control module 53 and a handover module 54.

The history processing module 52 is operable to build and maintain MT history data 55 for connected mode mobile telephones 3 that it is serving. At the time of the RRC connection for the mobile telephone 3 is set up, the MT history data 55 for the mobile telephone 3 will be empty. If the serving base station 5-2 receives idle mode cell history data from the mobile telephone 3 at the time of RRC connection, the base station 5-2 may use the received history information to populate the MT history data 55. Otherwise the MT history data 55 is started with just the cell information for the currently serving cell. The serving base station 5-2 continues to collect and store history information for a connected mode mobile telephone 3 for as long as the mobile telephone 3 stays in one of its cells. When the mobile telephone 3 is to be handed over to another base station 5/9, the serving base station 5-2 sends the MT history information 55 to the target base station 5/9 (or its RNC controller 7) so that it can continue to build and use the MT history data 55. The history processing module 52 is also operable to process the history data 55 to identify candidate target cells for handover and to detect if the mobile telephone 3 has "ping ponged" (ie repeatedly transferred) between two neighbouring cells.

In this embodiment, the history processing module 52 is operable to add the following cell information for the serving cell to the MT history data 55:

1) the Cell Global ID (CGI);
2) the cell type including:
   a. CSG type
   b. the access mode of the cell;
   c. the mobile telephone's access mode for the cell:
   d. CSG ID; and
   e. PCI/PSC, UARFCN (for UMTS), EARFCN(for LTE); and
3) timing data.

The CGI uniquely identifies the cell within the network. The cell type includes various information to identify the cell and whether it is a macro cell, micro cell, pico cell, femto cell etc. The CSG type defines whether or not the cell operates a Closed Subscriber Group. The access mode of the cell defines if there are restrictions on accessing the cell. For example, Open access mode defines that all mobile telephones 3 are allowed to gain access; Closed access mode defines that only members of a subscriber group can gain access to the cell; and Hybrid access mode defines that all mobile telephones can gain access to the cell, although those on a subscriber list are preferred subscribers that may be given preferential service, especially if the cell is busy. At present most macro cells have an open access mode, although in the future they too may operate in a closed or hybrid access mode. The mobile telephone's access mode for the cell identifies, for the case where the cell has a hybrid access mode, whether or not the mobile telephone 3 accessed the cell as a CSG member or as a non-CSG member. The timing data identifies the time that the mobile telephone 3 is served by the cell and is added at the time of handover.

Figure 3B:
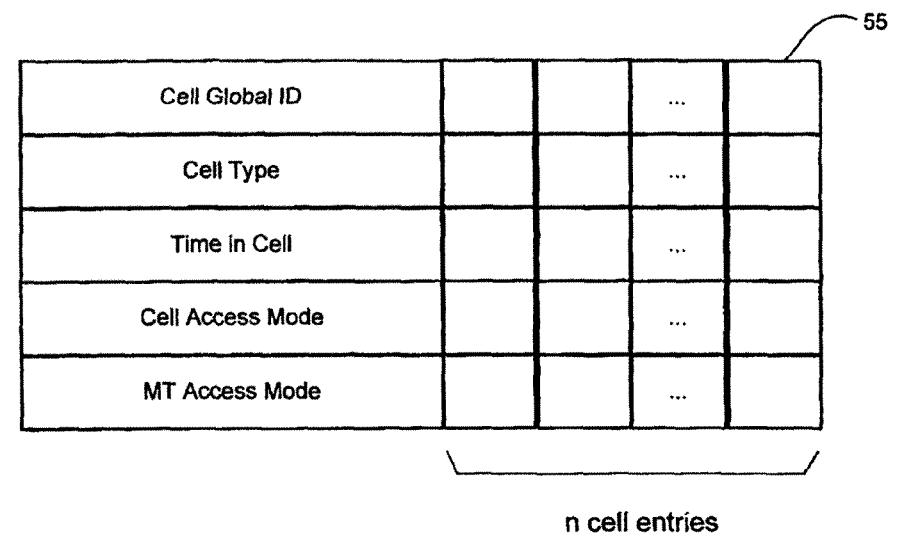

The MT history data 55 built up by the base station is illustrated in FIG. 3b. Typically the value of n is 16. Each time that cell information for a new cell is added to the MT history data 55, it over-writes the oldest cell information so that there is an upper limit on the amount of history data that has to be stored and processed for each mobile telephone 3.

The cell reselection control module 53 is operable to control cell reselection parameters transmitted by the base station 5-2. These parameters determine how the mobile telephones 3 camped on the cell decide whether to remain with the serving cell or reselect a neighbouring cell. If the history processing module 54 detects from idle mode history information provided by a mobile telephone 3 that the mobile telephone 3 ping ponged between the serving cell and a neighbouring cell, then the cell reselection control module 53 changes its cell reselection parameters to try to prevent the same repeated transferring from happening in the future.

The handover module 54 is operable to control handover of the mobile telephone 3 to another cell of the serving base station 5-2 or to a cell of another base station 5/9. Prior to deciding on the target cell for the handover, the serving cell will send the mobile telephone 3 a cell list 57 identifying a number of candidate cells on which the mobile telephone 3 should perform signal measurements so that a suitable target cell can be identified for the handover. In this embodiment, the history processing module 52 processes the information in the mobile telephone history data 55 to identify candidate target cells to include on the cell list 57 for the mobile telephone 3. In particular the history processing module 52 processes the history data 55 to identify cells that the mobile telephone 3 returned to a number of times, or cells on which the mobile telephone 3 camped for a long time or cells that have a closed access mode or a hybrid access mode and the mobile telephone 3 accessed as a CSG member. These cells are likely to include the user's home base station 9. Therefore by including the identified cells in the cell list 57, it is more likely that the mobile telephone 3 will handover to its home base station 9 if it is within range thereof. Alternatively, if the mobile telephone 3 is moving quickly (eg if it is in a car moving at speed—which can be detected from the timing data as in this case, the mobile telephone 3 is likely to stay in each cell for a relatively short period of time), then the history processing module 52 may decide not to include the smaller sized cells in the cell list 57 and only to include the larger macro cells—as this should reduce the handover signalling for the mobile telephone 3.

Once the handover module 54 has decided on the target cell, it will initiate the handover procedure to the target cell. As mentioned above, the handover module 54 sends the mobile telephone's history data 55 to the target base station 5/9 (or its RNC controller 7), so that the target base station 5/9 (or RNC controller 7) can continue to build and maintain the history data and to use the information contained therein to make similar handover decisions.

Mobile Telephone

Figure 4:
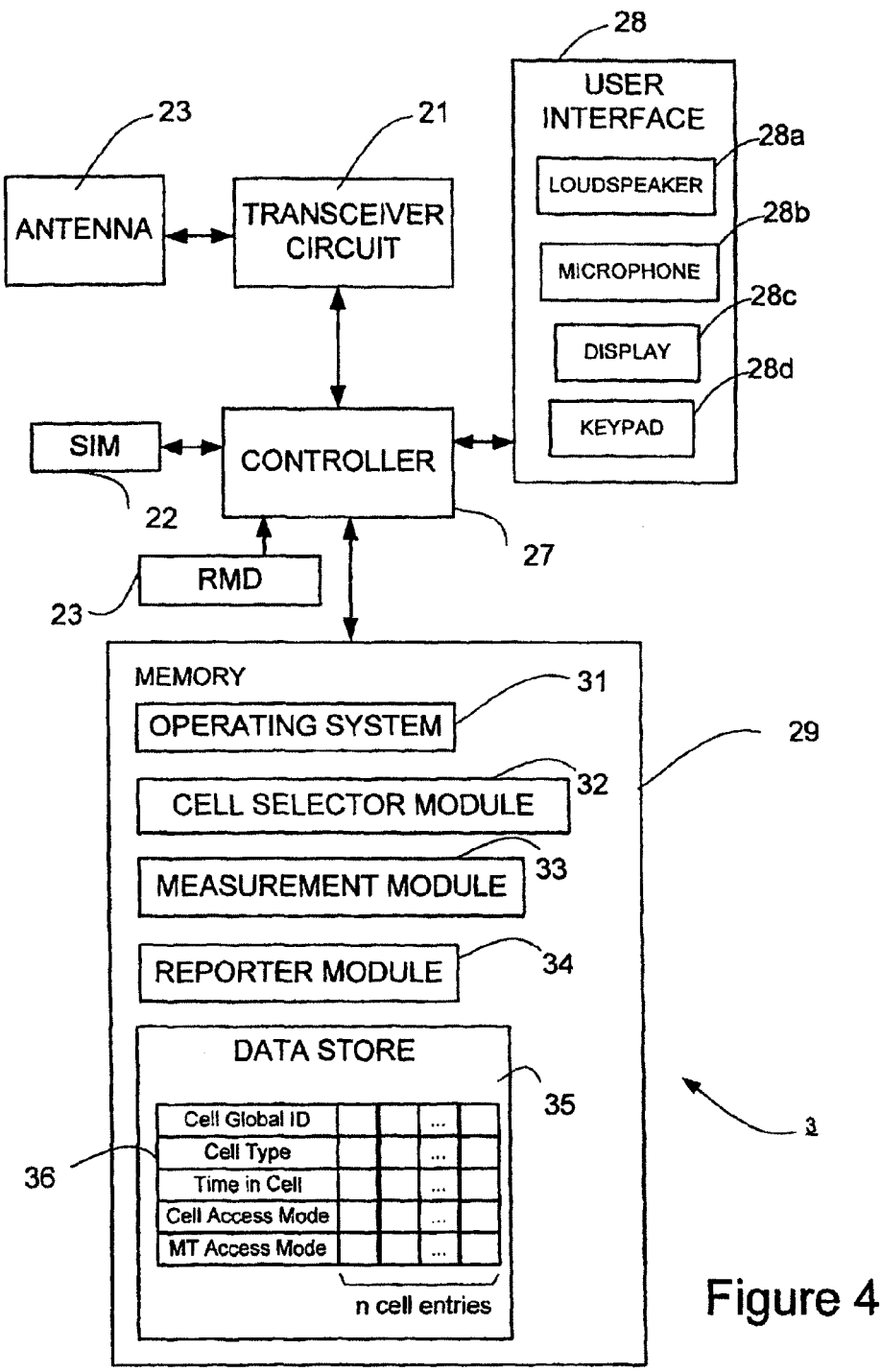
FIG. 4 is a functional block diagram to show some of the functionality of a mobile telephone shown in FIG. 1.
Figure 5:
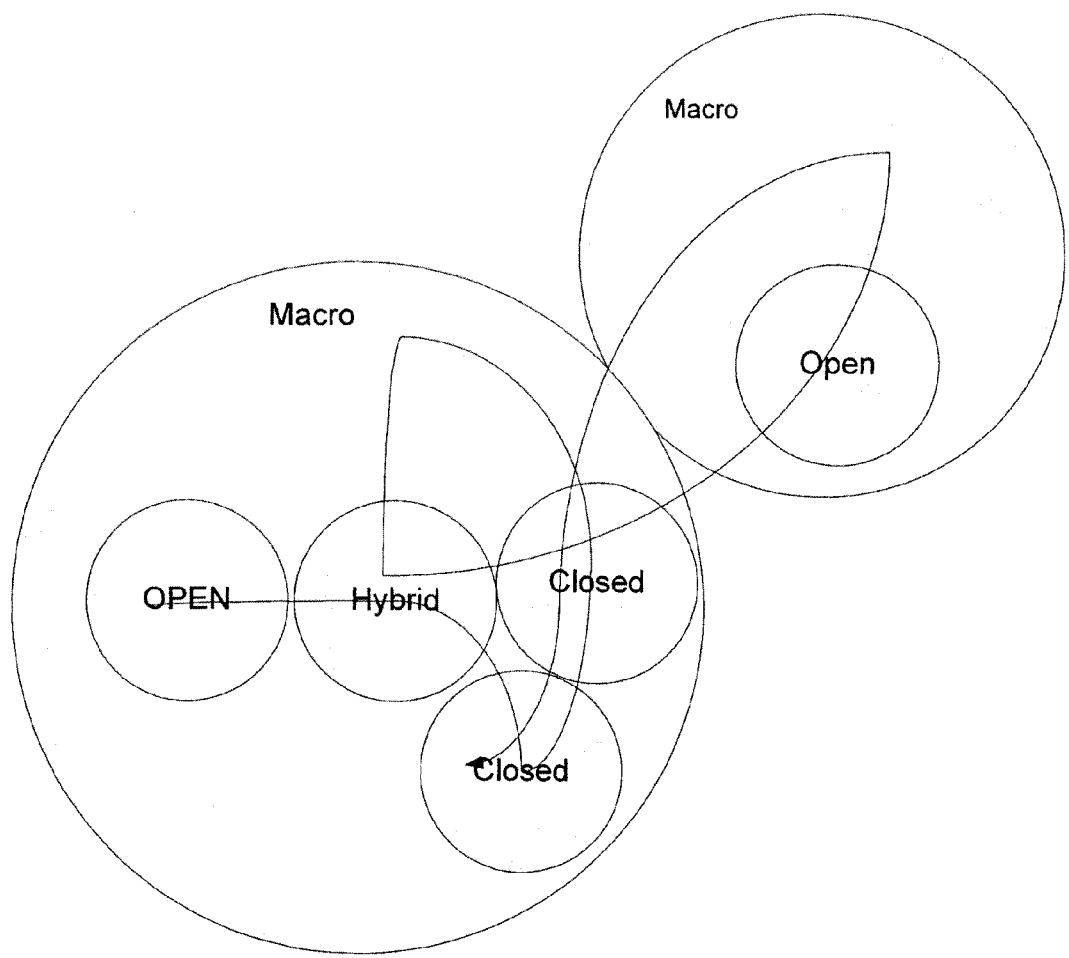
FIG. 5 is an example for UE transversal across cells in the mixed deployment in connection with a detailed description of the way in which the present invention may be implemented in the currently proposed 3GPP LTE standard.

FIG. 4 shows a functional block diagram of the mobile telephone 3 shown in FIG. 1. As shown, the mobile telephone 3 has a transceiver circuit 21 that is operable to transmit signals to and to receive signals from a base station 5/9 via one or more antenna 23. The mobile telephone 3 has a controller 27 to control the operation of the mobile telephone 3 and a SIM (Subscriber Identity Module) 22. The controller 27 is associated with a memory 29 and is coupled to the transceiver circuit 71 and to a user interface 28 having a loudspeaker 28a, a microphone 28b, a display 28c, and a keypad 28d. Although not necessarily shown in FIG. 4, the mobile telephone 3 will of course have all the usual functionality of a cellular telephone 3 and this may be provided by any one or any combination of hardware, software and firmware, as appropriate. Software may be pre-installed in the memory and/or may be downloaded via the telecommunications network or from a removable data storage device (RMD) 23, for example.

The controller 27 is configured to control overall operation of the mobile telephone 3 by, in this example, program instructions or software instructions stored within memory 29. As shown, these software instructions include, among other things, an operating system 31; a cell selector module 32 to perform cell reselection in accordance with cell reselection parameters provided by the serving base station 5/9; a measurement module 33 for obtaining measurements of neighbouring cells for the serving base station 5/9 prior to handover; a reporter module 34 for reporting to the serving base station 5/9 data relating to the cells within which the mobile telephone 3 has camped while in the idle state and, prior to handover, measurements on neighbouring cells.

The memory 29 also provides a data store 35 associated with the reporter module 34 to store idle mode cell history data 36 that includes, in this embodiment for each of the last n cells with which the mobile telephone 3 has camped while in the idle state:
 4) the Cell Global ID (CGI);
 5) the cell type including:
  a. CSG type
  b. the access mode of the cell;
  c. the mobile telephone's access mode for the cell;
  d. CSG ID; and
  e. PCI/PSC, UARFCN (for UMTS), EARFCN(for LTE); and
 6) timing data.

When the mobile telephone 3 is in its idle mode, the cell selector module 32 reselects cells according to the cell reselection parameters broadcast in the BCH (Broadcast Channel) of the serving cell. Each time the UE re-selects a new cell, the reporter module 34 updates the cell history data 36 by adding the appropriate information for the new cell as the nth cell in the cell history data 36, including logging the time at which the mobile telephone 3 switched to the new cell and storing the total time for which the mobile telephone 3 was camped in the previous cell. When the mobile telephone 3 enters its connected mode (for example, in order to make a call), the reporter module 32 reports the idle mode history data 36 to the serving cell so that it can use the information in the manner discussed above.

In the above description, the base station 5 and the mobile telephones 3 are described for ease of understanding as having a number of discrete functional components or modules (such as the history data processing module, cell reselection control module, cell selector module, reporter module etc). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Base Station and Network Messages

As mentioned above, in this embodiment, the serving cell informs other cells of the mobile telephone's history data 55. In the case of other E-UTRAN cells, the serving E-UTRAN base station 5-2 can inform the target base station by transferring the information over the base station interface (X2) 45. For UTRAN cells, the serving cell can inform the UTRAN cell's RNC 7 by transferring a suitable message to the RNC 7 via the core network 8. The cell information may also be sent to other nodes in the core network 8. Some of the messages that may be used are listed below.

X2 setup request/response messages (defined in TS 36.423, V8.6.03)

X2 setup request/response messages are used when two E-UTRAN base stations make X2 connections. During this procedure, both base stations exchange its serving cell information and its known neighbouring cell information. In this embodiment, the information that is exchanged also includes the cell access mode and, if available, the CSG ID.

| IE/Group Name | Presence | Range | IE type and reference | Semantics description | Criticality | Assigned Criticality |
|---|---|---|---|---|---|---|
| X2 Setup Request | | | | | | |
| Message Type | M | | 9.2.13 | | YES | reject |
| Global eNB ID | M | | 9.2.22 | | YES | reject |
| Served Cells | | 1 to maxCellineNB | | This is all the eNB cells | YES | reject |
| >Served Cell Information | M | | 9.2.8 | | — | — |
| >Neighbour Information | | 0 to maxnoofNeighbours | | | — | — |
| >>ECGI | M | | ECGI 9.2.14 | E-UTRAN Cell Global Identifier of the neighbour cell | — | — |
| >>PCI | M | | INTEGER (0 . . . 503, . . .) | Physical Cell Identifier of the neighbour cell | — | — |
| >>EARFCN | M | | 9.2.26 | DL EARFCN for FDD and EARFCN for TDD | — | — |
| >>CSG Type | | | | | | |
| >>CSG ID | | | | | | |
| >>Access mode | | (Open, Hybrid, Closed) | | | | |
| GU Group Id List | | 0 to maxfPools | | This is all the pools to which the eNB belongs to | GLOBAL | reject |
| >GU Group Id | M | | 9.2.20 | | — | — |

| IE/Group Name | Presence | Range | IE type and reference | Semantics description | Criticality | Assigned Criticality |
|---|---|---|---|---|---|---|
| X2 Setup Response | | | | | | |
| Message Type | M | | 9.2.13 | | YES | reject |
| Global eNB ID | M | | 9.2.22 | | YES | reject |
| Served Cells | | 1 to maxCellineNB | | This is all the eNB cells | YES | reject |
| >Served Cell Information | M | | 9.2.8 | | — | — |
| >Neighbour Information | | 0 to maxnoofNeighbours | | | — | — |
| >>ECGI | M | | ECGI 9.2.14 | E-UTRAN Cell Global Identifier of the neighbour cell | — | — |
| >>PCI | M | | INTEGER (0 . . . 503, . . .) | Physical Cell Identifier of the neighbour cell | — | — |
| >>EARFCN | M | | 9.2.26 | DL EARFCN for FDD and EARFCN for TDD | — | — |
| >>CSG Type | | (CSC, Non CSG) | | | | |
| >>CSG ID | | | | | | |
| >>Access mode | | (Open, Hybrid, Closed) | | | | |
| GU Group Id List | | 0 to maxPools | | This is all the pools to which the eNB belongs to | GLOBAL | reject |
| >GU Group Id | M | | 9.2.20 | | — | — |
| Criticality Diagnostics | O | | 9.2.7 | | YES | ignore |

| Range bound | Explanation |
|---|---|
| maxCellineNB | Maximum no. cells that can be served by an eNB. Value is 256. |
| maxnoofNeighbours | Maximum no. of neighbour cells associated to a given served cell. Value is 512. |
| maxPools | Maximum no. of pools an eNB can belong to. Value is 16 FFS. |

Last Visited E-UTRAN Cell Information (defined in TS 36.413, V8.6.1)

The Last Visited E-UTRAN Cell Information contains information about a cell that is to be used for RRM purposes.

| IE/Group Name | Presence | Range | IE type and reference | Semantics description | Criticality | Assigned Criticality |
|---|---|---|---|---|---|---|
| Global Cell ID | M | | E-UTRAN CGI 9.2.1.38 | | — | — |
| Cell Type | M | | 9.2.1.66 | | — | — |
| >>PCI | M | | INTEGER (0 ... 503, ...) | Physical Cell Identifier of the neighbour cell | — | |
| >>EARFCN | M | | 9.2.26 | DL EARFCN for FDD and EARFCN for TDD | — | |
| >>CSG Type | | | | | | |
| >>CSG ID | | | | | | |
| Access mode | | (Open, Hybrid, Closed) | | | | |
| UE Access mode | | (Preferential, Non-Preferential) | | | | |
| Time UE stayed in Cell | M | | INTEGER (0 ... 4095) | The duration of the time the UE stayed in the cell in seconds. If the UE stays in a cell more than 4095 s, this IE is set to 4095 | — | — |

Last Visited UTRAN Cell Information (TS 25.413, V8.3.0)

The Last Visited UTRAN Cell Information contains information about a cell that is to be used for RRM purposes.

| IE/Group Name | Presence | Range | IE type and reference | Semantics description |
|---|---|---|---|---|
| UTRAN Cell ID | | 1 | | |
| >PLMN identity | M | | OCTET STRING (SIZE (3)) | digits 0 to 9, encoded 0000 to 1001, 1111 used as filler digit, two digits per octet, bits 4 to 1 of octet n encoding digit 2n − 1 - bits 8 to 5 of octet n encoding digit 2n The PLMN identity consists of 3 digits from MCC followed by either a filler digit plus 2 digits from MNC (in case of 2 digit MNC) or 3 digits from MNC (in case of a 3 digit MNC). |
| >Cell ID | M | | INTEGER (0 ... 268435455) | This information element identifies a cell uniquely within UTRAN and consists of RNC-ID and C-ID as defined in TS 25.401 V8.2.0 [3]. |
| Cell Type | M | | ENUMERATED (macro, micro, pico, femto, ...) | Defined in [50]. |

-continued

| IE/Group Name | Presence | Range | IE type and reference | Semantics description |
|---|---|---|---|---|
| Time UE Stayed In Cell | M | | INTEGER (0 . . . 4095) | The duration of the time the UE stayed in the cell in seconds. If the UE stays in a cell more than 4095s, this IE is set to 4095 |
| >>PCI | M | | INTEGER (0 . . . 503, . . .) | Physical Cell Identifier of the neighbour cell |
| >>UARFCN | M | | 9.2.26 | DL UARFCN for FDD |
| >>CSG Type | | | | |
| >>CSG ID | | | | |
| Access mode | | (Open, Hybrid, Closed) | | |
| UE Access mode | | (Preferential, Non-Preferential) | | |

Served Cell information (defined in TS 36.423, V8.6.0)
This IE contains cell configuration information of a cell that a neighbour eNB may need for the X2 AP interface.

| IE/Group Name | Presence | Range | IE type and reference | Semantics description | Criticality | Assigned Criticality |
|---|---|---|---|---|---|---|
| PCI | M | | INTEGER (0 . . . 503, . . .) | Physical Cell ID | — | — |
| Cell ID | M | | ECGI 9.2.14 | | — | — |
| TAC | M | | OCTET STRING(2) | Tracking Area Code | — | — |
| >>CSG Type | | (CSG, Non CSG) | | | | |
| >>CSG ID | | | | | | |
| >>Access mode | | (Open, Hybrid, Closed) | | | | |
| Broadcast PLMNs | | 1 . . . <maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | | 1 | | | — | — |
| >>>UL EARFCN | M | | EARFCN 9.2.26 | Corresponds to $N_{UL}$ in ref. [16] | — | — |
| >>>DL EARFCN | M | | EARFCN 9.2.26 | Corresponds to $N_{DL}$ in ref. [16] | — | — |
| >>>UL Transmission Bandwidth | M | | Transmission Bandwidth 9.2 27 | | — | — |
| >>>DL Transmission Bandwidth | M | | Transmission Bandwidth 9.2 27 | Same as UL Transmission Bandwidth in this release. | — | — |
| >TDD | | | | | | |
| >>TDD Info | | 1 | | | — | — |
| >>>EARFCN | M | | 9.2.26 | Corresponds to $N_{DL}/N_{UL}$ in ref. [16] | — | — |
| >>>Transmission Bandwidth | M | | Transmission Bandwidth 9.227 | | — | — |
| >>>Subframe Assignment | M | | ENUMERATED (sa0, sa1, sa2, sa3, sa4, sa5, sa6, . . .) | Uplink-downlink subframe configuration information defined in ref. [10]. | — | — |
| >>>Special Subframe Info | | | | Special subframe configuration information defined in ref. [10]. | | |
| >>>>Special Subframe Patterns | M | | ENUMERATED (ssp0, ssp1, ssp2, ssp3, ssp4, ssp5, ssp6, ssp7, ssp8, . . .) | | — | — |
| >>>>Cyclic Prefix DL | M | | ENUMERATED (Normal, Extended, . . .) | | — | — |

-continued

| IE/Group Name | Presence | Range | IE type and reference | Semantics description | Criticality | Assigned Criticality |
|---|---|---|---|---|---|---|
| >>>>Cyclic Prefix UL | M | | ENUMERATED (Normal, Extended, . . .) | | — | — |
| Number of Antenna Ports | O | | 9.2.43 | | YES | ignore |

| Range bound | Explanation |
|---|---|
| maxnoofBPLMNs | Maximum no. of Broadcast PLMN Ids. Value is 6. |

| Range bound | Explanation |
|---|---|
| maxnoofeNBX2TLAs | Maximum no. of eNB X2 Transport Layer Addresses for an SCTP end-point. Value is 2. |

SON Information (defined in TS 36.413, V8.6.1)

This IE identifies the nature of the SON information transferred i.e. a request or a reply.

| IE/Group Name | Presence | Range | IE type and reference | Semantics description | Criticality | Assigned Critieality |
|---|---|---|---|---|---|---|
| Choice SON Information | | | | | — | |
| >SON Information Request | | | ENUMERATED (X2 TNL Configuration Info, TNL and served cell information . . .) | | — | |
| >SON Information Reply | | | 9.2.3.28 | | — | |

SON Information Reply

This IE contains the SON Information to be replied to the E-UTRAN base station.

| IE/Group Name | Presence | Range | IE type and reference | Semantics description |
|---|---|---|---|---|
| SON Information Reply | | | | |
| >X2 TNL Configuration Info | O | | 9.2.3.29 | |
| Served Cell Information | | | | Similar to updated Served Cell Information (TS 36.423) mentioned above |

X2 TNL Configuration Info

The X2 TNL Configuration Info IE is used for signalling X2 TNL Configuration information for automatic X2 SCTP association establishment.

| IE/Group Name | Presence | Range | IE type and reference | Semantics description |
|---|---|---|---|---|
| eNB X2 Transport Layer Addresses | | 1 to <maxnoofeNBX2TLAs> | | |
| >Transport Layer Address | M | | 9.2.2.1 | Transport Layer Addresses for X2 SCTP end-point. |

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, the UEs are cellular telephones. Other communications nodes or devices may include user devices such as, for example, personal digital assistants, laptop computers, web browsers, etc.

Although as described above the base station provides the cell selection/reselection parameter data, this data may be provided by another network device or devices.

In the above embodiment, both the mobile device and the mobile telephone collected cell history information. In an alternative embodiment, only one type of cell history information may be collected—either the connected mode history information (that is collected by the base stations) or the idle mode history information that is collected by the mobile telephone.

The present invention may be implemented in any communications system in which communications devices move between different cells or areas.

In the above embodiments, a number of software modules were described. As those skilled in the art will appreciate, the software modules may be provided in compiled or un-compiled form and may be supplied to the base station or to the UE as a signal over a computer network, or on a recording medium. Further, the functionality performed by part or all of this software may be performed using one or more dedicated hardware circuits. However, the use of software modules is preferred as it facilitates the updating of base station 5 and the UEs 3 in order to update their functionalities.

Various other modifications will be apparent to those skilled in the art and will not be described in further detail here.

Glossary of 3GPP Terms
    UE—User Equipment—user communications device
    RAT—Radio Access Technology
    RAN—Radio Access Network
    HO—Handover
    FACH—Forward Access Channel
    eNodeB, eNB—E-UTRAN base station
    LTE—Long Term Evolution (of UTRAN)
    UTRAN—UMTS Terrestrial Radio Access Network
    UMTS—Universal Mobile Telecommunications System
    MME—Mobility Management Entity
    TA—Tracking Area
    BCH—Broadcast Channel
    CP—Control Plane
    RRC—Radio Resource Control
    SON→Self Organising Network
    RRM—Radio Resource Management
    AP—Application Part
    IE—Information Element
    PCI/PSC—Physical Cell Identifier/Primary Scrambling Code
    UARFCN—UTRA Absolute Radio Frequency Channel Number
    EARFCN—E-UTRA Absolute Radio Frequency Channel Number
    TNL—Transport Network Layer
    SCTP—Stream Control Transmission Protocol The following is a detailed description of the way in which the present inventions may be implemented in the currently proposed 3GPP LTE standard. Whilst various features are described as being essential or necessary, this may only be the case for the proposed 3GPP LIE standard, for example due to other requirements imposed by the standard. These statements should not, therefore, be construed as limiting the present invention in any way.

1 Introduction

UE History information introduced as part of the release-8 LTE/UTRAN architecture. This information, which is transmitted between different eNBs or between RNC and eNB, involved in UE handover, should contain history information concerning the UE transversal across the cells-UE transverse previously. The architecture of LTE is characterised by the fact that there is no central base station controller manages the handovers to the other nodes. On the high level this information is used for RRM purposes, yet the actual usage of this information is implementation specific and not restricted by the specification. One of the possible uses of this information could be based on the UE movement pattern, the eNB can include these cells in the "Listed cells"—these are the cells listed within the measurement object and sent to UE to assist handover. Using this information the eNB/HeNB can create the neighbouring listed cell as per the deployment conditions.

It is anticipated that more and more H(e)NBs will be deployed in the operator network and hence in order to make real use of UE history information it is necessary to indicate precisely the type of visited cell i.e. Home cell or Marco cell, and if Home cell then the access mode of the cell i.e. Open, Closed or Hybrid. Moreover, if the Home cell is in hybrid mode then whether the UE is accessing the home cell as its preferential user or non-preferential user.

2 Discussion

From the UE point of view maintaining the fingerprints by UE is already acknowledged as a useful mechanism for H(e) NB deployments and acknowledged by RAN #2 as useful mechanism for inbound handover. It is assumed that a smart UE will use the finger prints to locate its home cells. Similarly, the network exchanges the path of the UE transversal during Handover to the target node. It is envisaged that the network uses the UE history information to optimize the candidate cells for possible future handovers. Moreover, it is expected that Home cells will probably share common carrier with the macro cells. In that case the importance of this information is more meaningful.

UE history information is one of the means to assist the easy handover methodology between the cells. In order to have the seamless mobility between the eNBs and the HeNBs it is required to properly filter the neighbouring cells. Another possible use case to not include home cells for high speed UEs.

During the discussion on H(e)NBs deployments scenarios, there is a common understanding that when the UE is near to its home cells then it is preferable to attempt to handover to its home cells. For all the above mentioned reason, UE history information could be better utilized if it is possible to indicate the home cells/macro cells which UE has visited previously. If network is aware of the cell types at the granularity of for example type eNB/HeNB, access mode (open, closed, hybrid), CSG ID, UE access mode for Hybrid (preferential, non preferential) information would be useful for the network to configure the cells in the "listed cell".

If the network finds out ping pong for the UE between the macro cells and its home cells, it will perform more meaning RRM functions using the proposed information than simply relying on the existing available information. What and how this information is used for RRM purposes are purely implementation specific, as currently also not specified in the specification. In fact, this document does not intend to describe all the scenarios for the usage of this information. Nevertheless, the usefulness of newly proposed information cannot be ruled out.

3 Conclusion

Form the above discussion; it is proposed to include the following parameters in the UE history information, applicable for both the UTRAN and E-UTRAN:

| Cell Type | |
|---|---|
| CSG Type | CSG/Non-CSG |
| Access mode | Open/Hybrid/Closed |
| UE Access mode | Preferential/Non Preferential (if Hybrid) |
| CSG ID | Value (if applicable) |
| PCI/PSC, UARPCN (for UMTS), EARFCN(for LTE) (tbc) | |

If there is an agreement, then NEC is happy to provide the stage-2/3 CRs.

4 Reference

[1] RP-090349 Support of Home NB and Home eNB enhancements RAN3 aspects
[2] TS 36.413, v8.61 S1AP Specification
[3] TS 25.413, v8.3.0 RANAP Specification
[4] TS 36.300, v8.9.0 E-UTRAN Architecture—Overall Description (Stage-2)

The proposed new information shall be included in the following IEs for RRM and network optimization purposes. Proposed Changes (Stage-3) for Internal Use Only 4.1.9.2.1.43a Last Visited E-UTRAN Cell Information (TS 36.413, V8.6.1)

The Last Visited E-UTRAN Cell Information contains information about a cell that is to be used for RRM purposes.

| IE/Group Name | Presence | Range | IE type and reference | Semantics description | Criticality | Assigned Criticality |
|---|---|---|---|---|---|---|
| Global Cell ID | M | | E-UTRAN CGI 9.2.1.38 | | — | — |
| Cell Type | M | | 9.2.1.66 | | — | — |
| Access mode | | (Open, Hybrid, Closed) | | | | |
| UE Access mode | | (Preferential, Non-Preferential) | | | | |
| Time UE stayed in Cell | M | | INTEGER (0 ... 4095) | The duration of the time the UE stayed in the cell in seconds. If the UE stays in a cell more than 4095 s, this IE is set to 4095 | — | — |

4.2.9.2.1.83 Last Visited UTRAN Cell Information (TS 25.413)

The Last Visited UTRAN Cell Information contains information about a cell that is to be used for RRM purposes.

| IE/Group Name | Presence | Range | IE type and reference | Semantics description |
|---|---|---|---|---|
| UTRAN Cell ID | | 1 | | |
| >PLMN identity | M | | OCTET STRING (SIZE (3)) | digits 0 to 9, encoded 0000 to 1001, 1111 used as filler digit, two digits per octet, bits 4 to 1 of octet n encoding digit 2n − 1 - bits 8 to 5 of octet n encoding digit 2n. The PLMN identity consists of 3 digits from MCC followed by either a filler digit plus 2 digits from MNC (in case of 2 digit MNC) or 3 digits from MNC (in case of a 3 digit MNC). |
| >Cell ID | M | | INTEGER (0 ... 268435455) | This information element identifies a cell uniquely within UTRAN and consists of RNC-ID and C-ID as defined in TS 25.401 V8.2.0 [3]. |
| Cell Type | M | | ENUMERATED (macro, micro, pico, femto, ...) | Defined in [50]. |
| Time UE Stayed In Cell | M | | INTEGER (0 ... 4095) | The duration of the time the UE stayed in the cell in seconds. If the UE stays in a cell more than 4095 s, this IE is set to 4095 |

It would be worth to include this proposed information in the following IEs also and could be used for the network optimization purposes.

4.3.9.1.2.3 X2 SETUP REQUEST (TS 36.423)

This message is sent by an eNB to a neighbouring eNB to transfer the initialization information for a TNL association. Direction: eNB1→eNB2.

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 to maxCellineNB | | This is all the eNB cells | YES | reject |
| >Served Cell Information | M | | 9.2.8 | | — | — |
| >Neighbour Information | | 0 to maxnoofNeighbours | | | — | — |
| >>ECGI | M | | ECGI 9.2.14 | E-UTRAN Cell Global Identifier of the neighbour cell | — | — |
| >>PCI | M | | INTEGER (0 . . . 503, . . .) | Physical Cell Identifier of the neighbour cell | — | — |
| >>EARFCN | M | | 9.2.26 | DL EARFCN for FDD and EARFCN for TDD | — | — |
| >>CSG Type | | | | | | |
| >>CSG ID | | | | | | |
| >>Access mode | | (Open, Hybrid, Closed) | | | | |
| GU Group Id List | | 0 to maxfPools | | This is all the pools to which the eNB belongs to | GLOBAL | reject |
| >GU Group Id | M | | 9.2.20 | | — | — |

| Range bound | Explanation |
|---|---|
| maxCellineNB | Maximum no. cells that can be served by an eNB. Value is 256. |
| maxnoofNeighbours | Maximum no. of neighbour cells associated to a given served cell. Value is 512. |
| maxPools | Maximum no. of pools an eNB can belong to. Value is 16 FFS. |

X2 SETUP REQUEST (TS 36.423, V8.6.0)

This message is sent by an eNB to a neighbouring eNB to transfer the initialization information for a TNL association. Direction: eNB2→eNB1.

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 to maxCellineNB | | This is all the eNB cells | YES | reject |
| >Served Cell Information | M | | 9.2.8 | | — | — |
| >Neighbour Information | | 0 to maxnoofNeighbours | | | — | — |
| >>ECGI | M | | ECGI 9.2.14 | E-UTRAN Cell Global Identifier of the neighbour cell | — | — |
| >>PCI | M | | INTEGER (0 . . . 503, . . .) | Physical Cell Identifier of the neighbour cell | — | — |

| IE/Group Name | Presence | Range | IE type and reference | Semantics description | Criticality | Assigned Criticality |
|---|---|---|---|---|---|---|
| >>EARFCN | M | | 9.2.26 | DL EARFCN for FDD and EARFCN for TDD | — | — |
| >>CSG Type | | (CSC, Non CSG) | | | | |
| >>CSG ID | | | | | | |
| >>Access mode | | (Open, Hybrid, Closed) | | | | |
| GU Group Id List | | 0 to maxPools | | This is all the pools to which the eNB belongs to | GLOBAL | reject |
| >GU Group Id | M | | 9.2.20 | | — | — |
| Criticality Diagnostics | O | | 9.2.7 | | YES | ignore |

| Range bound | Explanation |
|---|---|
| maxCellineNB | Maximum no. cells that can be served by an eNB. Value is 256. |
| maxnoofNeighhours | Maximum no. of neighbour cells associated to a given served cell. Value is 512. |
| maxPools | Maximum no. of pools an eNB can belong to. Value is 16 FFS. |

9.2.8 Served Cell Information (TS 36.423)

This IE contains cell configuration information of a cell that a neighbour eNB may need for the X2 AP interface.

| IE/Group Name | Presence | Range | IE type and reference | Semantics description | Criticality | Assigned Criticality |
|---|---|---|---|---|---|---|
| PCI | M | | INTEGER (0 ... 503, ...) | Physical Cell ID | — | — |
| Cell ID | M | | ECGI 9.2.14 | | — | — |
| TAC | M | | OCTET STRING(2) | Tracking Area Code | — | — |
| >>CSG Type | | (CSG, Non CSG) | | | | |
| >>CSG ID | | | | | | |
| >>Access mode | | (Open, Hybrid, Closed) | | | | |
| Broadcast PLMNs | | 1 ... <maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | | 1 | | | — | — |
| >>>UL EARTCN | M | | EARFCN 9.2.26 | Corresponds to $N_{UL}$ in ref. [16] | — | — |
| >>>DL EARFCN | M | | EARFCN 9.2.26 | Corresponds to $N_{DL}$ in ref. [16] | — | — |
| >>>UL Transmission Bandwidth | M | | Transmission Bandwidth 9.2 27 | | — | — |
| >>>DL Transmission Bandwidth | M | | Transmission Bandwidth 9.2 27 | Same as UL Transmission Bandwidth in this release. | — | — |
| >TDD | | | | | | |
| >>TDD Info | | 1 | | | — | — |
| >>>EARFCN | M | | 9.2.26 | Corresponds to $N_{DL}/N_{UL}$ in ref. [16] | — | — |
| >>>Transmission Bandwidth | M | | Transmission Bandwidth 9.2 27 | | — | — |

-continued

| IE/Group Name | Presence | Range | IE type and reference | Semantics description | Criticality | Assigned Criticality |
|---|---|---|---|---|---|---|
| >>>Subframe Assignment | M | | ENUMERATED (sa0, sa1, sa2, sa3, sa4, sa5, sa6, . . .) | Uplink-downlink subframe configuration information defined in ref. [10]. | — | — |
| >>>Special Subframe Info | | | | Special subframe configuration information defined in ref. [10]. | | |
| >>>>Special Subframe Patterns | M | | ENUMERATED (ssp0, ssp1, ssp2, ssp3, ssp4, ssp5, ssp6, ssp7, ssp8, . . .) | | — | — |
| >>>>Cyclic Prefix DL | M | | ENUMERATED (Normal, Extended, . . .) | | — | — |
| >>>>Cyclic Prefix UL | M | | ENUMERATED (Normal, Extended, . . .) | | — | — |
| Number of Antenna Ports | O | | 9.2.43 | | YES | ignore |

| Range bound | Explanation |
|---|---|
| maxnoofBPLMNs | Maximum no. of Broadcast PLMN Ids. Value is 6. |

This application is based upon and claims the benefit of priority from United Kingdom patent application No. 0914379.3, filed on Aug. 17, 2009, the disclosure of which is incorporated herein in its entirety by reference.

The invention claimed is:

1. A base station including a processor and a memory operable to communicate, over a wireless communications link defined by a base station cell, with one or more mobile communications devices in a communication network comprising a plurality of cells having one or more of an Open access mode, a Closed access mode, and a Hybrid access mode in which the cell operates as a Closed Subscriber Group (CSG) cell where at a same time, non-CSG members are allowed access,
   wherein the base station is operable to maintain cell history data for a mobile communications device, the cell history data identifying the plurality of cells with which the mobile communications device has been registered historically,
   wherein the cell history includes, for the cell, from among the plurality of cells, with which the mobile communications device has been registered historically having the Open access mode, data indicating that the cell has the Open access mode, and
   for the cell, from among the plurality of cells, with which the mobile communications device has been registered historically having the Closed access mode, data indicating that the cell has the Closed access mode;
   wherein the cell history data includes data indicating that the cell from among the plurality of cells with which the mobile communications device has been registered historically has the Hybrid access mode in which the cell operates as a Closed Subscriber Group (CSG) cell where at a same time, non-CSG members are allowed access; and
   wherein the base station is operable to provide the cell history data to another base station or to an RNC via a base station interface or via a core network interface.

2. The base station according to claim 1, wherein for the cell having a Hybrid access mode, the cell history data further comprises data identifying whether the mobile device accessed the cell as a CSG member or as a non-CSG member.

3. The base station according to claim 2, operable to use stored history data for Radio Resource Management purposes.

4. The base station according to claim 1, operable to use stored cell history data for Radio Resource Management purposes.

5. The base station according to claim 1, operable to use the cell history data to identify cells to include in a cell list provided to the at least one mobile communications device.

6. The base station according to claim 1, operable to provide cell history data to one or more of a neighboring cell and a network node.

7. The base station according to claim 6, operable to provide the cell history data to said one or more of the neighboring cell and the network node at a time of handover of the mobile communications device to another base station.

8. The base station according to claim 1, operable to use stored cell history data to identify a Home base station for the at least one mobile communications device.

9. The base station according to claim 1, operable to use the cell history data to identify cells to include in a cell list provided to the at least one mobile communications device.

10. A mobile communications device including a processor and a memory operable to camp on cells in a communication network comprising a plurality of cells having one or more of an Open access mode, a Closed access mode, and a Hybrid access mode in which the cell operates as a Closed Subscriber Group (CSG) cell where at a same time, non-CSG members are allowed access, the mobile communications device including an idle mode and a connected mode, wherein the mobile communications device is operable in the idle mode to store history data identifying the plurality of cells in which the mobile communications device has camped historically, wherein the cell history includes, for the cell, from among the plurality of cells, with which the mobile communications device has been registered historically having the Open access mode, data indicating that the cell has the Open access mode, and for the cell, from among the plurality of cells, with which the mobile communications device has been registered historically having the Closed access mode, data indicating that the cell has the Closed access mode; and wherein the history data includes data indicating that the cell with which the mobile communications device has been registered historically has the Hybrid access mode in which the cell operates as a Closed Subscriber Group (CSG) cell where at a same time, non-CSG members are allowed access.

11. The device according to claim 10, operable to report the history data to a serving cell.

12. The device according to claim 10, wherein for the cell having the Hybrid access mode, the history data further comprises data identifying whether the mobile device accessed the cell as a preferential or non-preferential device.

13. The device according to claim 10, operable to use stored history data to identify a Home base station.

14. A method performed by a mobile communications device in a communication network comprising a plurality of cells having one or more of an Open access mode, a Closed access mode, and a Hybrid access mode in which the cell operates as a Closed Subscriber Group (CSG) cell where at a same time, non-CSG members are allowed access, the mobile communications device including an idle mode and a connected mode, the method comprising, in the idle mode, storing history data identifying the plurality of cells in which the mobile communications device has camped historically, wherein the cell history includes, for the cell, from among the plurality of cells, with which the mobile communications device has been registered historically having the Open access mode, data indicating that the cell has the Open access mode, and for the cell, from among the plurality of cells, with which the mobile communications device has been registered historically having the Closed access mode, data indicating that the cell has the Closed access mode; and wherein the history data includes data indicating that the cell with which the mobile communications device has been registered historically has the Hybrid access mode in which the cell operates as a Closed Subscriber Group (CSG) cell where at a same time, non-CSG members are allowed access.

15. A method performed by a base station operable to communicate, over a wireless communications link defined by a base station cell, with one or more mobile communications devices in a communication network comprising a plurality of cells having one or more of an Open access mode, a Closed access mode, and a Hybrid access mode in which the cell operates as a Closed Subscriber Group (CSG) cell where at a same time, non-CSG members are allowed access, the method comprising maintaining cell history data for a mobile communications device, the cell history data identifying the plurality of cells with which the mobile communications device has been registered historically, wherein the cell history includes, for the cell, from among the plurality of cells, with which the mobile communications device has been registered historically having the Open access mode, data indicating that the cell has the Open access mode, and for the cell, from among the plurality of cells, with which the mobile communications device has been registered historically having the Closed access mode, data indicating that the cell has the Closed access mode; and wherein the cell history data includes data indicating that the cell with which the mobile communications device has been registered historically has the Hybrid access mode in which the cell operates as a Closed Subscriber Group (CSG) cell where at a same time, non-CSG members are allowed access; and providing the cell history data to another base station or to an RNC via a base station interface or via a core network interface.

16. A computer implementable instruction product including the memory and the processor comprising computer implementable instructions for causing a mobile communications device to become configured as the base station of claim 1.

17. A computer implementable instruction product including the memory and the processor comprising computer implementable instructions for causing a mobile communications device to become configured as the mobile communications device of claim 10.

* * * * *